United States Patent
Ayama et al.

(10) Patent No.: US 6,664,321 B2
(45) Date of Patent: Dec. 16, 2003

(54) WEAR RESISTANT RESIN COMPOSITION

(75) Inventors: Kazuhiko Ayama, Tokuyama (JP); Hitoshi Inata, Tokuyama (JP); Koji Ohgi, Tokuyama (JP)

(73) Assignee: Tokuyama Corporation, Yamaguchi (JP)

( * ) Notice: Subject to any disclaimer, the term of this patent is extended or adjusted under 35 U.S.C. 154(b) by 0 days.

(21) Appl. No.: 09/782,218

(22) Filed: Feb. 14, 2001

(65) Prior Publication Data

US 2002/0045698 A1 Apr. 18, 2002

(30) Foreign Application Priority Data

Jul. 25, 2000 (JP) ......................................... 2000-224249

(51) Int. Cl.$^7$ ................................................. C08K 3/18
(52) U.S. Cl. ...................... 524/433; 524/432; 524/449; 524/515; 524/493; 524/494; 260/29.7 H; 264/211.23; 428/500; 428/515
(58) Field of Search ................................. 524/449, 515, 524/493, 494, 432, 433; 264/211.23; 260/29.7 H; 428/500, 515

(56) References Cited

U.S. PATENT DOCUMENTS

| 4,257,935 | A | * | 3/1981 | Sekiguchi et al. | ........... | 524/555 |
| 5,238,989 | A | * | 8/1993 | Takei et al. | ................. | 524/449 |
| 5,264,174 | A | * | 11/1993 | Takei et al. | ............ | 264/211.23 |
| 5,418,272 | A | | 5/1995 | Kawabata et al. | ........... | 524/436 |
| 5,804,665 | A | * | 9/1998 | Watanabe et al. | ............ | 525/323 |
| 5,998,039 | A | * | 12/1999 | Tanizaki et al. | ............. | 428/516 |
| 6,190,772 | B1 | | 2/2001 | Yamano et al. | .............. | 428/379 |
| 6,268,063 | B1 | * | 7/2001 | Kaminaka et al. | .......... | 428/500 |

FOREIGN PATENT DOCUMENTS

| JP | 253846 A | 2/1990 |
| JP | 5320468 A | 12/1993 |
| JP | 200026696 A | 1/2000 |

OTHER PUBLICATIONS

Gottfried Glockner; "Temperature Rising Elution Fractionation: A Review"; 45, pp. 1–24 (1990).

* cited by examiner

Primary Examiner—David W. Wu
Assistant Examiner—Henry Hu
(74) Attorney, Agent, or Firm—Birch, Stewart, Kolasch & Birch, LLP

(57) ABSTRACT

A wear resistant resin composition containing (A) 100 parts by weight of a modified microblend obtained by bonding an organic acid group to a microblend consisting of 1 to 70 wt % of polypropylene and 99 to 30 wt % of a propylene-ethylene random copolymer consisting of 15 to 50 mol % of an ethylene polymer unit and 85 to 50 mol % of a propylene polymer unit, or a mixture of the microblend and the modified microblend, and (B) 1 to 1,000 parts by weight of at least one filler of a fibrous filler or a lamellar filler, the microblend contains 10 to 90 wt % of a component eluting at a temperature of −40 to +30° C. based on the total of all the eluting components fractionated by temperature rise elution fractionation using o-dibromobenzene as a solvent. The composition has a flexural modulus of 2,000 MPa or less.

11 Claims, No Drawings

WEAR RESISTANT RESIN COMPOSITION

DETAILED DESCRIPTION OF THE INVENTION

The present invention relates to a novel wear resistant resin composition. More specifically, it relates to a wear resistant resin composition which is excellent in wear resistance and heat resistance, has rubber-like physical properties with good balance between compressive stress and compressive stress relaxation, and can be re-molded.

Out of thermoplastic resins, polyolefin resins are excellent particularly in chemical resistance, insulating properties, heat stability and the like and therefore widely used as raw materials for molding various products.

Out of such polyolefin resins, thermoplastic polyolefin resins having rubber-like properties are used for various purposes that require flexibility, such as interior and exterior parts for an auto-movil, materials for covering rod-like and linear products which are extrusion molded at a high speed, and further mud guards and desk mats.

For the above applications, an inorganic filler is blended into a polyolefin to improve the mechanical strength of the obtained molded product or provide flame retardancy to the molded product.

However, the above polyolefin has such a problem that its wear resistance is lowered by blending the inorganic filler. Particularly when the flexural modulus of the obtained molded product is 2,000 MPa or less, there is seen a strong tendency that a contact portion of the molded product wears away through repetitions of its sliding contact with the same molded product or another member.

To improve the wear resistance of a molded product of a polyolefin containing an inorganic filler, JP-A 2-53846 (the term "JP-A" as used herein means an "unexamined published Japanese patent application") and U.S. Pat. No. 5,418,272 have proposed a resin composition which comprises a polyolefin-based resin, a thermoplastic elastomer having an organic acid group bonded by acid modification and an inorganic filler (inorganic flame retardant).

The above polyolefin-based resin is a copolymer or rubber essentially composed of ethylene.

The above acid modification technology is aimed to improve the adhesion of the composition to the inorganic filler by bonding the organic acid group to the polyolefin or to improve wear resistance by partly crosslinking the inorganic filler with a metal.

However, a composition obtained by adding an ethylene-based resin to the above polyolefin to achieve flexibility is still unsatisfactory in terms of heat resistance.

When a resin having a high melting point such as polypropylene is used as a matrix resin, a large amount of a soft resin such as the above ethylene-based resin or rubber material must be added to achieve flexibility. The obtained composition has low heat resistance and further low mechanical properties such as tensile strength like the above composition.

It is an object of the present invention to provide a wear resistant resin composition which is a polyolefin composition containing an inorganic filler and excellent in wear resistance, rubber-like physical properties and heat resistance, and can be re-molded.

Other objects and advantages of the present invention will be apparent from the following description.

According to the present invention, the above objects and advantages of the present invention are attained by a wear resistant resin composition comprising: (A) 100 parts by weight of a modified microblend obtained by bonding an organic acid group to a microblend (may be referred to as "specific microblend" hereinafter) consisting of 1 to 70 wt % of polypropylene and 99 to 30 wt % of a propylene-ethylene random copolymer (may be referred to as "P-E random copolymer" hereinafter) consisting of 15 to 50 mol % of an ethylene polymer unit and 85 to 50 mol % of a propylene polymer unit, or a mixture of the microblend and the modified microblend, the concentration of the organic acid group in the modified microblend or the mixture being 0.01 to 1 mmol based on 1 g of the microblend, and the microblend containing 10 to 90 wt % of a component eluting at a temperature of −40 to +30° C. (may be referred to as "low-temperature eluting component" hereinafter) based on the total of all the eluting components fractionated by temperature rise elution fractionation using o-dibromobenzene as a solvent; and
(B) 1 to 1,000 parts by weight of at least one filler selected from the group consisting of a fibrous filler and a lamellar filler,
and having a flexural modulus of 2,000 MPa or less.

According to the present invention, there is also provided a wear resistant resin composition having more improved heat resistance by further blending polypropylene as a resin composition.

In the present invention, the flexural modulus is a value measured in accordance with JIS K7203.

The temperature rising elution fractionation used in the present invention is a means of analyzing the composition or the distribution of stereoregularity or non-crystallinity of a crystalline polymer such as a polyolefin and carried out by the following operation. A high-temperature solution of the specific microblend is first introduced into a column filled with a filler such as diatomaceous earth or glass beads, and components having higher melting points are crystallized one after another on the surface of the filler by gradually reducing the temperature of the column. Thereafter, components having lower melting points are eluted and dispensed one after another by gradually increasing the temperature of the column. In the present invention, the rate of reducing the temperature of the column in the above measurement is 2° C./hr. The rate of increasing the temperature of the column is 4° C./hr.

As for the concrete operation, please refer to the Journal of Applied Polymer Science; Applied Polymer Symposium, 45, 1–24 (1990). In the fractionation of a copolymer composition by the above method, a resin composition having no crystallinity or extremely low crystallinity is fractionated at a relatively low temperature lower than normal temperature and components having higher crystallinity are fractionated along with a rise in elution temperature. The amount of each fractionated component can be calculated from an elution curve drawn by plotting elution temperature as the axis of abscissa and integrated weight percentage as the axis of ordinate.

In the present invention, it is important that the specific microblend should satisfy the following conditions at the same time.
(1) The amount of a component eluting at a temperature of −40 to +30° C. is 10 to 90 wt %, preferably 30 to 80 wt % based on the total of all the eluting components fractionated by temperature rising elution fractionation using an o-dibromobenzene solvent.
(2) The specific microblend consists of 1 to 70 wt %, preferably 1 to 40 wt % of polypropylene and 99 to 30 wt %, preferably 99 to 60 wt % of a propylene-ethylene random copolymer which consists of 15 to 50 mol %, preferably 15 to 40 mol % of an ethylene polymer unit and 85 to 50 mol %, preferably 85 to 60 mol % of a propylene polymer unit.

That is, the above specific microblend is characterized in that a sufficiently large amount of a low-temperature eluting component is contained although the content of the propylene polymer unit in the P-E random copolymer is large. Due to this feature, the obtained wear resistant resin composition exhibits excellent wear resistance and rubber-like physical properties and exhibits superior in heat resistance to a conventional wear resistant resin composition comprising a polyolefin essentially composed of an ethylene polymer unit. Due to use of the above specific microblend, the wear resistant resin composition of the present invention is also excellent in physical properties such as tensile strength.

When the low-temperature eluting component of the above specific microblend is contained in an amount of less than 10 wt %, flexibility lowers as a large amount of a crystal component is contained in the resin, thereby making it difficult to obtain a resin composition having a flexural modulus of 2,000 MPa or less which the present invention is directed to.

When the low-temperature eluting component of the above specific microblend is contained in an amount of more than 90 wt %, heat resistance lowers, the stickiness of the resin becomes high, and blocking tends to occur.

When the specific microblend has the following stepwise distribution of eluting components fractionated by temperature rising elution fractionation in the present invention, it further improves wear resistance and rubber-like physical properties advantageously.

That is, the specific microblend is particularly preferably a microblend which consists of a component eluting at a temperature of −40° C. or more and less than 20° C. (component "a") in an amount of 20 to 80 wt %, a component eluting at a temperature of 20° C. or more and less than 100° C. (component "b") in an amount of 10 to 70 wt % and a component eluting at a temperature higher than 100° C. (component "c") in an amount of 1 to 40 wt %, all of which are fractionated by temperature rise elution fractionation using an o-dichlorobenzene solvent (the total of the components "a", "b" and "c" is 100 wt %).

That is, the component "a" contributes to the development of the flexibility of the obtained wear resistant resin composition. When the amount of the component "a" is smaller than 20 wt %, the flexibility of the obtained wear resistant resin composition is easily impaired and when the amount is larger than 80 wt %, sufficient heat resistance is hardly obtained. To obtain higher flexibility, the amount of the component "a" is preferably 30 to 70 wt %.

The component "b" develops compatibility between the components "a" and "c". As a result, it is effective in maintaining good balance between the flexibility and heat resistance of the obtained wear resistant resin composition. When the amount of the component "b" is smaller than 10 wt %, the flexibility of the obtained wear resistant resin composition tends to lower and when the amount is larger than 70 wt %, the heat resistance of the composition is apt to be unsatisfactory. To maintain good balance between the flexibility and heat resistance of the obtained wear resistant resin composition, the amount of the component "b" is preferably 15 to 50 wt %.

The component "c" is effective in providing excellent heat resistance which is the feature of polypropylene to the obtained wear resistant resin composition. When the amount of the component "c" is smaller than 1 wt %, the heat resistance of the obtained wear resistant resin composition tends to lower, thereby making it difficult to attain the object of the present invention. When the amount of the component "c" is larger than 40 wt %, the flexibility of the obtained wear resistant resin composition is easily impaired. To obtain higher heat resistance, the amount of the component "c" is preferably 5 to 30 wt %.

In the specific microblend of the present invention, the polypropylene corresponds to the component "c" eluting by the above temperature rising elution fractionation (may be abbreviated as TREF hereinafter). The polypropylene may be a homopolymer of propylene, a propylene-α-olefin random copolymer and propylene-α-olefin block copolymer comprising an α-olefin polymer unit other than propylene in an amount of 10 mol % or less.

They may be used alone or in admixture of two or more.

Examples of the α-olefin include ethylene, butene-1,1-pentene, 1-hexene, 1-octene, 3-methyl-1-butene and 4-methyl-1-pentene.

In the specific microblend of the present invention, the P-E random copolymer substantially corresponds to the components "a" and "b" eluting by the above TREF. It is important in attaining the object of the present invention that the amount of the ethylene polymer unit should be 15 to 50 mol % and the amount of the propylene polymer unit should be 85 to 50 mol % based on the P-E random copolymer. More preferably, the amount of the propylene polymer unit is 85 to 60 mol % and the amount of the ethylene polymer unit is 15 to 40 mol %.

When the amount of the propylene polymer unit is larger than 85 mol % and the amount of the ethylene polymer unit is smaller than 15 mol %, the flexibility of the obtained wear resistant resin composition is impaired and when the amount of the propylene polymer unit is smaller than 50 mol % and the amount of the ethylene polymer unit is larger than 50 mol %, the heat resistance of the obtained wear resistant resin composition is impaired.

In the present invention, the specific microblend may contain an α-olefin polymer unit other than the above propylene polymer unit and ethylene polymer unit in limits that do not change its characteristic properties markedly.

Stated more specifically, it may contain an α-olefin polymer unit such as 1-butene in an amount of 10 mol % or less.

In the present invention, the above specific microblend can be produced by a method described in JP-A 5-320468. JP-A 5-320468 is included in the description of the present invention. The term "microblend" as used in the present invention can be understood as a mixture of polypropylene and the P-E random copolymer produced by the above method in a molecular order or an order close thereto. The above microblend may also be conventionally called "propylene-ethylene block copolymer".

In the present invention, the weight average molecular weight of the specific microblend obtained by the above production method is not particularly limited. The weight average molecular weight in terms of polystyrene of the specific microblend is preferably 70,000 to 7,000,000, more preferably 200,000 to 3,000,000, particularly preferably 300,000 to 2,000,000.

The melt flow rate (MFR) of the specific microblend is preferably adjusted to 0.3 to 150 g/10 minutes to be used.

In the present invention, to improve the wear resistance of the soft resin composition which is lowered by the addition of an inorganic filler without preventing an effect obtained by adding the inorganic filler, it is important that a modified microblend should be used by bonding an organic acid group to the specific microblend in a concentration of 0.01 to 1 mmol/g.

That is, when the concentration of the organic acid group bonded to the specific microblend is lower than 0.01 mmol/g, wear resistance lowers disadvantageously. When the concentration of the organic acid group is higher than 1 mmol/g, the effect is not improved, which is not preferred from an economical point of view.

In the above modified microblend, the concentration of the organic acid group bonded to the specific microblend is preferably 0.05 to 0.7 mmol/g, more preferably 0.1 to 0.3 mmol/g.

The type of the above organic acid group is not particularly limited. It is generally an organic acid group provided by an unsaturated organic acid or a derivative such as an acid anhydride thereof.

Examples of the organic acid group include monobasic acids, dibasic acids and acid anhydrides such as acrylic acid, methacrylic acid, maleic acid, fumaric acid, itaconic acid, citraconic acid, maleic anhydride, citraconic anhydride and itaconic anhydride. Metal salts, imides, amides and esters of the above unsaturated organic acids may also be used.

To obtain the modified microblend by bonding an organic acid group to the specific microblend, any known method may be used. For example, there are employed a method in which the specific microblend and an unsaturated organic acid or a derivative such as an acid anhydride thereof are contacted to each other in an inactive organic solvent, a method in which a mixture of the specific microblend and an unsaturated organic acid or a derivative such as an acid anhydride thereof is irradiated with radiation such as an electron beam, X-ray, α-ray or γ-ray, and a method in which a reaction initiator typified by an organic peroxide is mixed with the specific microblend and an unsaturated organic acid or a derivative such as an acid anhydride thereof and melt mixed. The last method is the most preferred from an industrial point of view.

Examples of the organic peroxide used in the method for obtaining the above modified microblend include dicumyl peroxide, 2,5-dimethyl-2,5-di(t-butylperoxy)hexane, 2,5-dimethyl-2,5-(t-butylperoxy)hexine-3-di-t-butyl peroxide, cumene hydroperoxide, t-butylhydroperoxide, benzoyl peroxide, lauroyl peroxide, 1,3-bis(t-butylperoxyisobutyl) benzene and α, α-bis(t-butylperoxydiisopropyl)benzene.

To obtain the above modified microblend, a method in which vinyl acetate, acrylic ester, unsaturated carboxylic acid or the like is copolymerized during the polymerization of the above specific microblend may also be employed.

In the present invention, a mixture containing the organic acid group in the above concentration may be prepared by forming a master batch by bonding the organic acid group in an amount larger than 1 mmol based on 1 g of the specific microblend and mixing the master batch with the specific microblend to be used in place of the modified microblend. When this mixture is used, it is to be understood that the amount of the specific microblend which is a standard for the concentration of the organic acid group means the total amount of the specific microblend to be mixed with the modified microblend and the specific microblend before modification.

The mixture of the specific microblend and the modified microblend is preferably a mixture consisting of 10 to 90 wt % of the specific microblend and 90 to 10 wt % of the modified microblend.

In the present invention, polypropylene is preferably added separately in an amount that ensures that the obtained wear resistant resin composition should achieve the above flexural modulus.

Polypropylene is used in an amount of preferably 500 parts or less by weight, more preferably 500 to 33 parts by weight, particularly preferably 330 to 40 parts by weight based on 100 parts by weight of the above modified microblend or the above mixture.

That is, when the amount of polypropylene is larger than 500 parts by weight, the flexibility of the obtained polypropylene-based resin composition is easily impaired and when the amount is smaller than 33 parts by weight, the effect of improving heat resistance tends to lower.

The above polypropylene may be a homopolymer of propylene, a propylene-α-olefin random copolymer or a micloblend consisting of polypropylene and propylene-α-olefin random copolymer comprising an α-olefin polymer unit other than propylene in an amount of 15 mol % or less.

They may be used alone or in admixture of two or more.

Examples of the α-olefin include ethylene, butene-1,1-pentene, 1-hexene, 1-octene, 3-methyl-1-butene and 4-methyl-1-pentene.

The melt flow rate (MFR) of the above polypropylene is preferably 0.3 to 150 g/10 minutes.

In the present invention, a fibrous filler and/or a lamellar filler are/is blended into the above polyolefin resin to develop good balance among compressive stress, compressive stress relaxability and flexural modulus at the time of compression deformation.

Any known fibrous filler may be used in the present invention. The fibrous filler has an average fiber diameter of preferably 0.1 to 2 μm, more preferably 0.5 to 1.0 μm, and an aspect ratio of preferably 3 to 1,000, more preferably 15 to 80.

When the average fiber diameter is smaller than 0.1 μm, dispersibility may become poor, thereby worsening the appearance of the obtained composition. When the average fiber diameter is larger than 2 μm, the diameter becomes too large, thereby worsening the appearance of the obtained molded product.

When the aspect ratio is lower than 3, the effect of improving compressive stress becomes insufficient. When the aspect ratio is higher than 1,000, the appearance of the molded product worsens disadvantageously.

The amount of the above fibrous filler is generally 1 to 1,000 parts by weight, preferably 20 to 600 parts by weight based on 100 parts by weight of the specific microblend or a mixture of the modified microblend and the specific microblend. It is more preferably 1 to 300 parts by weight, particularly preferably 20 to 200 parts by weight based on 100 parts by weight of the total of all the resin components comprising the specific microblend, a mixture of the modified microblend and the specific microblend, or the total of the specific microblend or a mixture of the modified microblend and the specific microblend and polypropylene. When the amount of the fibrous filler is smaller than 1 part by weight based on 100 parts by weight of the specific microblend or a mixture of the modified microblend and the specific microblend, the compressive stress of the molded product hardly improves and when the amount is larger than 1,000 parts by weight, the appearance of the molded product worsens disadvantageously.

Examples of the fibrous filler include fibrous magnesium oxysulfate, potassium titanate fibers, magnesium hydroxide fibers, aluminum borate fibers, calcium silicate fibers, calcium carbonate fibers, glass fibers, carbon fibers, metal fibers, asbestos, wollastonite, gypsum fibers, mineral fibers, and organic fibers (such as polyamide fibers and polyester fibers). Out of these, fibrous magnesium oxysulfate is preferred.

The surface of the fibrous filler may be treated with a known surface treatment agent to improve its dispersibility.

Examples of the surface treatment agent include fatty acid metal salts and coupling agents. Out of these, the surface of the fiber is preferably treated with magnesium stearate or sodium stearate to improve its dispersibility. Known adhesive resins may also be used.

Any known lamellar filler may be used in the present invention. The lamellar filler has an average particle diameter obtained by particle size distribution measurement using a laser diffraction scattering method of preferably 0.5 to 10 µm, more preferably 1 to 6 µm, and an aspect ratio of preferably 3 to 200, more preferably 15 to 80.

When the particle diameter is smaller than 0.5 µm, the dispersibility of the lamellar filler may be poor. When the particle diameter is larger than 10 µm, the appearance of the obtained composition may worsen disadvantageously.

When the aspect ratio is smaller than 3, the effect of improving compressive stress may become unsatisfactory. When the aspect ratio is larger than 200, the appearance of the molded product may worsen disadvantageously.

The amount of the lamellar filler is generally 1 to 1,000 parts by weight based on 100 parts by weight of the specific microblend or a mixture of the modified microblend and the specific microblend. It is preferably 1 to 300 parts by weight, more preferably 10 to 250 parts by weight based on 100 parts by weight of the total of all the resin components comprising the specific microblend, a mixture of the modified microblend and the specific microblend, or the total of the specific microblend or a mixture of the modified microblend and the specific microblend and polypropylene.

When the amount of the lamellar filler is smaller than 1 part by weight, the compressive stress of the molded product does not improve and when the amount is larger than 300 parts by weight, the appearance of the molded product worsens disadvantageously.

Any lamellar filler may be used if it satisfies the above conditions. Examples of the lamellar filler include talc, mica, clay, glass flake, graphite, aluminum flake, kaolin clay, iron oxide, sericite, molybdenum disulfide, barium sulfate, vermiculite, magnesium hydroxide, aluminum hydroxide and hydrotalcite.

The surface of the lamellar filler may be treated with a known surface treatment agent to improve its dispersibility. Examples of the surface treatment agent include fatty acid metal salts and coupling agents. Out of these, the surface of the lamellar filler is preferably treated with magnesium stearate or sodium stearate to improve its dispersibility. Known adhesive resins may also be used.

Further, the fibrous filler and the lamellar filler may be used in combination in any ratio.

In the present invention, the above fibrous filler and lamellar filler preferably serve as an ionically crosslinking agent.

The ionically crosslinking agent acts on the organic acid group contained in the above specific microblend by melt mixing to form an ionically crosslinked structure. The ionically crosslinked structure can provide excellent heat resistance and rubber-like properties to the wear resistant resin composition and makes it possible for the composition to exhibit excellent recyclability although it is a crosslinked product.

In the present invention, the material which functions as an ionically crosslinking agent may be suitably selected from the above fillers. For example, hydroxides of polyvalent metals such as magnesium hydroxide and aluminum hydroxide are particularly preferred.

The above hydroxides have functions as a crosslinking agent and also as a flame retardant and acid trapping agent for catching a free acid after crosslinking when they are added in large quantities.

The existence and degree of ion crosslinking formed by the above ionically crosslinking agent can be confirmed by checking the infrared spectrum of a gel portion. That is, an absorption band based on bonding between a carboxyl group or acid anhydride group and a polyvalent metal ion is formed at 1,560 $cm^{-1}$, whereby it can be confirmed that the above crosslinking reaction has been carried out.

In the wear resistant resin composition of the present invention, the proportion of the gel portion showing the proportion of a crosslinked portion is preferably 10 to 80 wt %, more preferably 20 to 60 wt %.

The proportion of the gel portion in the above wear resistant resin composition can be adjusted by controlling the concentration of an organic acid group in the above modified microblend, the amount thereof, and the amount of the ionically crosslinking agent.

As described above, the wear resistant resin composition of the present invention exerts an extremely marked effect on heat resistance compared with a conventional polyolefin-based elastomer due to the existence of a special gel portion derived from the specific microblend.

Although the function and mechanism that the above effect can be developed by the above gel portion are not made clear in the present invention, it is assumed that they are due to the following fact. The above gel portion contains an ionically crosslinked product of the specific microblend having a special crystallinity distribution and shows an appropriate swelling tendency for a solvent even when its average crosslinking density is made relatively high. Thereby, it shows excellent dispersibility in a matrix resin, excellent heat resistance for conventional TPO as described above and unique rubber-like properties which cannot be achieved with conventional TPO.

A slight amount of a crosslinked product is formed in the gel contained in the wear resistant resin composition of the present invention by a reaction for bonding the organic acid group. The gel in the present invention may contain part of the crosslinked product together with the ionically crosslinked product.

In the present invention, the expression "gel portion in the wear resistant resin composition" means the proportion of an insoluble material obtained after 6 hours of Soxhlet extraction of a sample resin composition cut into strands having a diameter of 2.5 to 3.5 mm with p-xylene.

The gel portion is for a polymer composition and the proportion thereof is calculated by excluding an insoluble component when the polymer composition contains the insoluble component other than a crosslinked polymer, for example, an inorganic material.

In the present invention, the flowability of the wear resistant resin composition at the time of melting is not particularly limited. However, the melt flow rate (may be abbreviated as MFR hereinafter) is preferably 100 g/10 min or less, generally 20 g/10 min or less.

The melt flow rate is a value measured in accordance with JIS K7210.

The wear resistant resin composition of the present invention may contain various additives in limits that satisfy the requirements of the present invention.

For example, a polyolefin resin other than the above specific microblend and polypropylene may be blended. Examples of the polyolefin resin include propylene-ethylene random copolymer, propylene-ethylene block copolymer, high-density polyethylene, intermediate-density polyethylene, low-density polyethylene, linear polyethylene composed of a copolymer of ethylene and an α-olefin having 4 to 10 carbon atoms, ethylene-propylene copolymer (EPDM), ethylene-butene-1 copolymer, propylene-butene-1 copolymer, poly1-butene, poly1-pentene, poly4-methylpentene-1, polybutadiene and polyisoprene.

A resin other than the above polyolefin resins, such as ethylene-vinyl acetate copolymer, ethylene methacrylate, polychloroprene, polyethylenehalide, polypropylenehalide, fluororesin, acrylonitrile-butadiene rubber, polystyrene, polybutadiene terephthalate, polycarbonate, polyvinyl chloride, fluorine rubber, polyethylene terephthalate, polyamide, acrylonitrile-butadiene-styrene copolymer, petroleum resin, petroleum resin-based hydrocarbon such as hydrogenated petroleum resin, terpene resin or hydrogenated terpene resin, styrene-butadiene-styrene block copolymer, styrene-isoprene-styrene block copolymer, styrene-ethylene-butylene-styrene block copolymer, styrene-propylene-butylene-styrene block copolymer or aromatic vinyl-based rubber such as a hydride of the above copolymer may also be blended. The above resin may have the above organic acid group.

These resins as additives are used in an amount of preferably 40 parts or less by weight, more preferably 20 parts or less by weight, particularly preferably 15 parts or less by weight based on 100 parts by weight of the modified microblend or the above mixture containing the same.

The polyolefin resin composition of the present invention may contain a known spherical filler such as zeolite, diatom, calcium carbonate, silica, silicate or glass bead as required in addition to the above filler components. The above fillers may be used in combination of two or more.

The amount of the above filler is preferably 0.1 to 80 parts by weight based on the 100 parts by weight of the total of all the resin components.

The wear resistant resin composition of the present invention may further contain other additives in limits that do not impair the effect of the present invention. The additives include a hindered amine-based thermal stabilizer; hindered amine-based weathering agent; benzophenone-based, benzotriazole-based or benzoate-based ultraviolet light absorber; nonionic, cationic or anionic antistatic agent; bisamide-based or wax-based dispersant; amide-based, wax-based, organic metal salt-based or ester-based lubricant; oxide-based decomposer; melamine-based, hydrazine-based or amine-based metal inactivating agent; bromine-containing organic, phosphate-based, antimony trioxide, red phosphorus-based, silicon-based, silica-based, melamine-based, glass-based or hydrous inorganic flame retardant; organic pigment; inorganic pigment; sorbitol-based, aromatic phosphoric acid metal salt-based or organic acid metal-based transparentizing or nucleating agent; antifogging agent; antiblocking agent; foaming agent; organic filler; and metal ion-based inorganic anti-fungus agent and organic anti-fungus agent. The present invention is not limited by these.

Further, any known phenolic antioxidant may be used in the wear resistant resin composition of the present invention as required with no limitation. Examples of the antioxidant include 2,6-di-t-butyl-4-hydroxyphenol, 2,6-di-t-butyl-p-cresol, 2,6-diphenyl-4-octadecyloxyphenol, stearyl(3,5-di-t-butyl-4-hydroxyphenyl)propionate, distearyl(3,5-di-t-butyl-4-hydroxybenzyl)phosphonate, thiodiethylene glycol bis[(3,5-di-t-butyl-4-hydroxyphenyl)propionate], 4,4'-thiobis(6-t-butyl-m-cresol), 2-octylthio-4,6-di(3,5-di-t-butyl-4-hydroxyphenoxy)-s-triazine, 2,2'-methylenebis(4-methyl-6-t-butylphenol), 2,2'-methylenebis(4-ethyl-6-t-butylphenol), bis[3,3'-bis(4-hydroxy-3-t-butylphenyl)butyric acid]glycol ester, 4,4'-butylidenebis(6-t-butyl-m-cresol), 2,2'-ethylidenebis(4,6-di-t-butylphenol), 2,2'-ethylidenebis(4-t-butyl-6-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl]terephthalate, 1,3,5-tris(2,6-dimethyl-3-hydroxy-4-t-butylbenzyl)isocyanate, 1,3,5-tris(3,5-di-t-butyl-4-hydroxybenzyl)isocyanate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl] isocyanate, tetrakis[methylene(3,5-di-t-butyl-4-hydroxyphenyl)propionate]methane, 2-t-butyl-4-methyl-6-(2-acryloyloxy-3-t-butyl-5-methylbenzyl)phenol, 3,9-bis(1,1-dimethyl-2-hydroxyethyl)-2,4,8,10-tetraoxaspiro[5,5] undecane-bis[β-(3-t-butyl-4-hydroxy-5-methylphenyl) propionate], and triethylene glycol bis[β-(3-t-butyl-4-hydroxy-5-methylphenyl)propionate].

The phenolic antioxidant is used in an amount of 0.001 to 1 part by weight, preferably 0.01 to 0.8 part by weight based on 100 parts by weight of the total of all the resin components.

The above phenolic antioxidants may be used alone or in combination of two or more.

When the amount of the above phenolic antioxidant is smaller than 0.001 part by weight, the deterioration of the obtained resin becomes marked, resulting in the yellowed resin. When the amount of the phenolic antioxidant is larger than 1 part by weight, it is not preferred economically.

Any known organic phosphorus-based antioxidant may be used in the wear resistant resin composition of the present invention as required. Examples of the organic phosphorus-based antioxidant include trisnonylphenyl phosphite, tris(2,4-di-t-butylphenyl)phosphite, di(tridecyl)pentaerythritol diphosphite, bis(2,4-di-t-butylphenyl)pentaerythritol diphosphite, bis(2,6-di-t-butyl-4-methylphenyl) pentaerythritol diphosphite, tetra(tridecyl) isopropylidenediphenol diphosphite, tetra(tridecyl)-4,4-n-butylidenebis(2-t-butyl-5-methylphenol)diphosphite, hexa(tridecyl)-1,1'-3-tris(3-t-butyl-4-hydroxy-5-methylphenyl) butane triphosphite, 2,2'-methylenebis(4,6-di-t-butylphenyl) octyl phosphite, 2,2'-methylenebis(4,6-di-t-butylphenyl) octadecyl phosphate, 2,2'-methylenebis(4,6-di-t-butylphenyl)fluorophosphite and tetrakis(2,4-di-t-butylphenyl)biphenylene diphosphonite.

The organic phosphorus-based antioxidant is used in an amount of 0.001 to 1 part by weight, preferably 0.01 to 0.8 part by weight based on 100 parts by weight of the total of all the resin components.

The above organic phosphorus-based antioxidants may be used alone or in combination of two or more.

When the amount of the organic phosphorus-based antioxidant is smaller than 0.001 part by weight, the deterioration of the resin becomes marked, resulting in the yellowed resin. When the amount is larger than 1 part by weight, it is not preferred economically.

Any known thioether-based antioxidant may also be used in the wear resistant resin composition of the present invention as required. Examples of the thioether-based antioxidant include dialkyl thiodipropionates such as dilauryl, dimyristyl and distearyl esters of thiodipropionic acid, and β-alkylmercaptopropionic acid esters of a polyol such as pentaerythritol tetra(β-dodecylmercaptopropionate).

The thioether-based antioxidant is used in an amount of 0.001 to 1 part by weight, preferably 0.01 to 0.8 part by weight based on 100 parts by weight of the total of all the resin components.

The above thioether-based antioxidants may be used alone or in combination of two or more.

When the amount of the thioether-based antioxidant is smaller than 0.001 part by weight, the deterioration of the resin becomes marked, resulting in the yellowed resin. When the amount is larger than 1 part by weight, it is not preferred economically.

The above phenolic antioxidants, organic phosphorus-based antioxidants and thioether-based antioxidants may be used alone or in combination of two or more if the total amount of the components is 0.001 to 2 parts by weight, preferably 0.01 to 1 part by weight based on 100 parts by weight of the total of all the resin components.

In the present invention, the above components may be mixed by any method generally used for mixing a resin. For example, other resins, additives and filler are added to the above resin in the form of a powder and/or pellet and mixed together by a tumbler, Henschel mixer, Banbury mixer, ribbon feeder or super mixer, and melt mixed by a single-screw or multi-screw extruder (preferably a melt mixer capable of degassing), roll, kneader or Banbury mixer at a melt mixing temperature of 150 to 350° C., preferably 190 to 280° C. to prepare a pellet.

The addition order of the above components is not particularly limited and may be different from the order of the above method. A master batch containing other additives and filler components condensed in a high concentration may be prepared and mixed.

A molded product which is satisfactory in terms of rubber-like properties with good balance between compressive stress and the value of compressive stress relaxation, wear resistance and heat resistance can be obtained from the wear resistant resin composition of the present invention.

A compressive stress at a distortion of 5% of 0.4 MPa to 20 MPa and a compressive stress relaxation value of 20 to 80% can be achieved and a molded product having the above physical properties is particularly preferred in the present invention.

The measurement of the above compressive stress can be carried out in accordance with the method specified in JIS K7181. In the present invention, the compressive stress is particularly preferably 2 to 15 MPa at a distortion of 5%. The compressive stress at a distortion of 5% is measured at a compression speed of 200 mm/min. A molded product having the above range of compressive stress can further improve buckling resistance while retaining appropriate flexibility.

The measurement of the above compressive stress relaxation value is carried out in accordance with the compression distortion method specified in JIS K7181. The expression "stress relaxation" means the reduction rate of stress with the passage of time. In the present invention, the compressive stress relaxation value is particularly preferably 30 to 70%. The compressive stress is measured at a compression speed of 200 mm/min, the value at a distortion of 5% is maintained for 10 minutes, and the stress after 10 minutes is measured to obtain a compressive stress relaxation value by dividing a reduction in stress for 10 minutes by stress at the start of maintaining a compression of 5%. What has the above range of stress relaxation value can further improve the stress absorption characteristics and buckling resistance of a molded product obtained from the polyolefin resin composition of the present invention.

The wear resistant resin composition of the present invention has extremely high wear resistance as described above. A resin composition having a wear resistance measured by the following method of 0 to 20%, particularly 5 to 15% can be obtained.

The measurement of wear resistance is carried out as follows. A test piece measuring 12.5 mm (width)×125 mm (length)×3 mm (thickness) is formed by injection molding, annealed at room temperature for 48 hours, fixed to a jig with the entire surface measuring 125 mm×3 mm as a wear testing surface, and rubbed with No. 600 sandpaper at a rate of 150 m/min and a contact bonding stress of 0.25 MPa to obtain the amount of wear, and the amount of wear is then divided by the weight of the test piece before the test to obtain wear resistance.

The wear resistant resin composition of the present invention is also excellent in terms of environmental preservation such as recyclability and the prevention of a harmful gas generated at the time of combustion, in addition to the above characteristic properties.

Therefore, the wear resistant resin composition of the present invention can be used as molded products and industrial parts such as interior and exterior parts of automovils, materials for covering rod-like and linear products, sheets, bottles, cases and pipes and also advantageously used in medical apparatuses, stationery, surface protective materials, construction sheets, cosmetic sheets, interior protective materials, water-barrier materials, decorative surface materials, food package materials, waterproofing materials and surface cover materials. Also the composition can be extremely advantageously used as a raw material for molded products which must have little influence upon environment and sanitation.

EXAMPLES

The following examples and comparative examples are provided for the purpose of further illustrating the present invention but are in no way to be taken as limiting.

Measurements and evaluations in the examples and comparative examples were carried out by the following methods.

(a) Weight Average Molecular Weight of Microblend

The used apparatuses and measurement conditions include the GPC-150C of Waters Co., Ltd., a temperature of 135° C., o-dichlorobenzene as a solvent, the TSK GMH6-HT column of Tosoh Corporation and a gel of 10 to 15 $\mu$m in size. A calibration curve for converting the elution curve of polypropylene into a molecular weight distribution curve was obtained as follows. That is, monodisperse polystyrenes having molecular weights of 950, 2,900, 10,000, 50,000, 498,000, 2,700,000, 6,750,000 and 20,600,000 were used as standard samples to obtain a calibration curve for polystyrene. This was converted into a calibration curve for polypropylene by the method described at pages 64 to 66 of the above document "Gel Permeation Chromatography". The constant used for conversion is a value shown in Table 5 of the above document.

(b) Measurement of Organic Acid Group Contained in Modified Microblend Resin

To measure the amount of a graft organic acid contained in the modified microblend block copolymer, an analytical curve was formed. Styrene and a predetermined organic acid were added to benzene, azobisisobutyronitrile was added to obtain a styrene-organic acid copolymer which was then added to homopolypropylene, and the resulting mixture was formed into a sheet. An analytical curve was obtained from the absorbance of the organic acid measured by an infrared spectrophotometer and the thickness of the sheet. The modified microblend was totally dissolved in p-xylene by heating, re-precipitated in a large amount of methanol, dried and formed into a sheet to measure the absorbance of an organic acid by an infrared spectrophotometer, and the organic acid group contained in the modified microblend resin was measured using the obtained analytical curve.

(c) Temperature Rising Elution Fractionation

This was carried out under the following measurement conditions using the SSC-7300 of Senshu Kagakusha Co., Ltd.
solvent: o-dichlorobenzene or o-dibromobenzene
flow rate: 2.5 ml/min
temperature elevation rate: 4.0° C./hr
concentration of sample: 0.7 wt %
amount of sample: 100 ml
detector: infrared detector, wavelength of 3.14 μm
column: 30 mm in diameter×300 mm
filler: Chromosorb P of 30 to 60 in mesh
column cooling rate: 2.0° C./hr (d) Compressive Stress at a Distortion of 5%

The measurement of compressive stress was carried out in accordance with the method specified in JIS K7181. In the present invention, compressive stress is particularly preferably 2 to 15 MPa at a distortion of 5%. Compressive stress at a distortion of 5% was measured at a compression speed of 200 mm/min. What has the above range of compressive stress can further improve buckling resistance while it has appropriate flexibility.

(e) Compressive Stress Relaxation Value

The measurement of the compressive stress relaxation value was carried out in accordance with the compressive strain method specified in JISK7181. The expression "stress relaxation" means the reduction rate of stress with the passage of time. In the present invention, the compressive stress relaxation value is particularly preferably 30 to 70%. The compressive stress was measured at a compression speed of 200 mm/min, the value at a distortion of 5% was maintained for 10 minutes, and the stress after 10 minutes was measured to obtain a compressive stress relaxation value by dividing a reduction in stress for 10 minutes by stress at the start of maintaining a compression of 5%. What has the above range of stress relaxation value can further improve the stress absorption characteristics and buckling resistance of a molded product obtained from the polyolefin resin composition of the present invention.

(f) Flexural Modulus

This was measured in accordance with JIS K7203.

(g) Surface Appearance of Molded Product

A flat plate measuring 360 mm (length)×100 mm (width)×3 mm (thickness) was injection molded at a cylinder temperature of 230° C. and the surface appearance of the plate was observed with the eye and evaluated based on the following criteria.
good: even surface
bad: uneven surface due to flow marks and poor dispersion (h) Wear Resistance The measurement of wear resistance was carried out as follows. A test piece measuring 12.5 mm (width)×125 mm (length)×3 mm (thickness) was formed by injection molding, annealed at room temperature for 48 hours, fixed to a jig with the entire surface measuring 125 mm×3 mm as a wear testing surface, and rubbed with No. 600 sandpaper at a rate of 150 m/min and a contact bonding stress of 0.25 MPa for 10 minutes to obtain the amount of wear which was then divided by the weight of the test piece before the test to obtain wear resistance.

(i) Rubber Elasticity (Tensile Test)

Rubber elasticity was measured by a tensile test specified in JIS K6251. The existence of necking from the start of measurement till break was observed and indicated. The term "necking" means the excessive elongation of part of a measurement site when test stress is applied. When necking occurs, a test sample is judged as poor in rubber-like physical properties and when necking does not occur, the test sample has rubber elasticity while the entire measurement site is uniformly stretched.

(j) Proportion of Gel Portion 5 g of a sample having a particle diameter of 2.5 to 3.5 mm obtained by cutting a strand was placed into a stainless steel net bag to carry out Soxhlet extraction at a boiling point of p-xylene for 6 hours. The extracted sample was dried at 70° C. for 18 hours by a vacuum drier to measure the amount of the residue after extraction (the percentage of a gel portion). The gel portion is for a polymer composition and the proportion thereof was calculated by excluding by baking or the like an insoluble component when the polymer composition contained the insoluble component other than a crosslinked product, for example, an inorganic material.

(k) Heat Resistance (Vicat Softening Point)

This was measured in accordance with JIS K7206.

(l) Moldability (Appearance of Strand Extruded by Capillograph).

The surface roughness of a strand sample extruded by a capillograph from an orifice having a diameter of 1 mm and a length of 20 mm at 210° C. and a shearing speed of $1 \times 10^4$ [−S] was observed.

Polymers used in examples and comparative examples were obtained by the following methods.

Sample 1:

(Prepolymerization)

The inside of a 1-liter glass autoclave reactor equipped with a stirrer was fully substituted with nitrogen gas and 400 ml of hexane was charged. The inside temperature of the reactor was maintained at 20° C., 18.5 mmol of diethylaluminum chloride, 22.7 mmol of ethyl iodide, 0.18 mmol of diethylene glycol dimethyl ether and 22.7 mmol of titanium trichloride (of Marubeni Sorbei Kagaku Co., Ltd.) were added to the reactor, and propylene was continuously introduced into the reactor for 30 minutes in an amount of 3 g per 1 g of titanium trichloride.

The temperature during this was maintained at 20° C. After the supply of propylene was stopped, the inside of the reactor was fully substituted with nitrogen gas, and 1-butene was continuously introduced into the reactor for 1 hour in an amount of 10 g per 1 g of a solid catalytic component. After the supply of 1-butene was stopped, the inside of the reactor was fully substituted with nitrogen gas, and the obtained titanium-containing polypropylene was washed with purified hexane four times. The results of analysis revealed that 2.7 g of propylene and 7.7 g of 1-butene were polymerized per 1 g of titanium trichloride. The obtained titanium-containing polypropylene was washed with purified hexane four times.

(Polymerization)

1 m³ of liquid propylene and 3.36 mol of diethylaluminum chloride were added to a 2 m³ autoclave whose inside had been substituted with $N_2$, and the inside temperature of the autoclave was raised to 55° C.

Thereafter, ethylene was supplied to the autoclave to ensure that the concentration of ethylene in a gas phase became 1.5 mol %, and the titanium-containing polypropylene obtained by prepolymerization was added in an amount of 0.42 mol in terms of titanium trichloride to carry out copolymerization between propylene and ethylene at 55° C. for 30 minutes. During this, hydrogen was not used (step 1).

Thereafter, 2.4 mol of ethylaluminum sesquiethoxide ($Et_3Al_2(OEt)_3$) and 0.067 mol of butyl acetate were added and ethylene gas was supplied to ensure that the concentration of ethylene gas in the gas phase was maintained at 11 mol % to carry out polymerization for 120 minutes (step 2). A polymer was obtained by purging unreacted monomers.

The obtained polymer was dried at 70° C. for 1 hour. The melt flow rate of the obtained polymer was 0.010 g/10 min or less. The polymer was a microblend.

The measurement results of the characteristic properties of the thus obtained microblend are shown in Table 1 as sample 1.

Sample 2:

Homopolypropylene was obtained in the same manner as the sample 1 except that polymerization was carried out for 150 minutes without supplying ethylene in step 1 and that step 2 was not carried out.

Sample 3:

titanium tetrachloride catalyst T-Cat carried on magnesium chloride (Preparation of Titanium Compound)

0.95 g (10 mmol) of anhydrous magnesium chloride, 10 ml of decane and 4.7 ml (30 mmol) of 2-ethylhexyl alcohol were heated at 125° C. for 2 hours and stirred. 0.55 g (6.75 mmol) of phthalic acid anhydride was added to this solution and further stirred and mixed together at 125° C. for 1 hour to prepare a uniform solution. After the solution was cooled to room temperature, the whole amount thereof was added dropwise to 40 ml (0.36 mol) of titanium tetrachloride maintained at 120° C. over 1 hour. Thereafter, the temperature of this mixed solution was raised to 110° C. over 2 hours and 0.54 ml of diisobutyl phthalate was added when the temperature reached 110° C., and the resulting mixture was maintained at 110° C. for 2 hours under agitation. After 2 hours of a reaction, the reaction solution was filtered to collect solid matter which was then re-suspended in 200 ml of $TiCl_4$ and a reaction was carried out again by heating at 110° C. for 2 hours. After the end of the reaction, solid matter was collected again by heating and filtration and completely washed with decane and hexane until a free titanium compound could not be detected in the wash liquid. The solid Ti catalyst consisted of 2.1 wt % of titanium, 57 wt % of chlorine, 18.0 wt % of magnesium and 21.9 wt % of diisobutyl phthalate.

(Prepolymerization)

The inside of a 1-liter glass autoclave reactor equipped with a stirrer was fully substituted with nitrogen gas. The inside temperature of the reactor was maintained at 10° C., 400 ml of n-hexane, 13.8 mmol of triethylaluminum, 1.38 mmol of cyclohexylmethyl dimethoxysilane, 6.9 mmol of ethyl iodide and 1.38 mmol in terms of Ti atoms of a solid Ti catalyst were charged into the reactor, and propylene was continuously introduced into the reactor for 30 minutes in an amount of 3 g per 1 g of the solid catalytic component. The temperature during this was maintained at 15° C. After the supply of propylene was stopped, the inside of the reactor was fully substituted with nitrogen gas, and 1-butene was continuously introduced into the reactor for 1 hour in an amount of 15 g per 1 g of the solid catalytic component. After the supply of 1-butene was stopped, the inside of the reactor was fully substituted with nitrogen gas, and the obtained titanium-containing polypropylene was washed with purified n-hexane four times. The results of analysis revealed that 2.1 g of propylene and 9.2 g of 1-butene were polymerized per 1 g of the solid catalyst.

(Polymerization)

1 $m^3$ of liquid propylene, 3.4 mol of triethylaluminum and 1.7 mol of cyclohexylmethyl dimethoxysilane were added to a 2 $m^3$ autoclave whose inside had been substituted with $N_2$, and the inside temperature of the autoclave was raised to 55° C. Thereafter, ethylene was supplied to the autoclave to ensure that the concentration of ethylene in a gas phase became 1.0 mol %, and the titanium-containing propylene-1-butene copolymer obtained by prepolymerization was added in an amount of 6.7 mmol in terms of Ti atoms to carry out polymerization at 55° C. for 150 minutes so as to obtain a propylene-ethylene random copolymer. The melt flow rate of the copolymer was 0.01 g/10 min or less.

Sample 4:

A propylene-ethylene random copolymer was obtained in the same manner as the sample 3 except that the concentration of ethylene gas in the gas phase was changed to 10 mol %. The melt flow rate of the copolymer was 0.01 g/10 min or less.

Sample 5:

A microblend was obtained in the same manner as the sample 1 except that the concentration of ethylene gas in the gas phase in step 2 was changed to 15 mol %. The melt flow rate of the copolymer was 0.01 g/10 min or less.

Sample 6:

A microblend was obtained in the same manner as the sample 3 except that polymerization was carried out for 20 minutes by supplying ethylene gas to a concentration of 0.8 mol % in the gas phase (step 1) and that polymerization was then carried out for 120 minutes by supplying ethylene gas to a concentration of 30 mol % in the gas phase (step 2). The melt flow rate of the copolymer was 0.01 g/10 min or less. Polymerization was carried out in the presence of a titanium tetrachloride compound carried on magnesium chloride and triethylaluminum to obtain a microblend shown in Table 1.

Sample 7:

(Prepolymerization)

The inside of a 1-liter glass autoclave reactor equipped with a stirrer was fully substituted with nitrogen gas, and 400 ml of hexane was charged. The inside temperature of the reactor was maintained at 20° C., 4.2 mmol of dicyclopentyl dimethoxysilane, 21.5 mmol of ethyl iodide, 21.5 mmol of triethylaluminum and 21.5 mmol of titanium trichloride (of Marubeni Sorbei Kagaku Co., Ltd.) were added to the reactor, and propylene was continuously introduced into the reactor for 30 minutes in an amount of 3 g per 1 g of titanium trichloride.

The temperature during this was maintained at 20° C. After the supply of propylene was stopped, the inside of the reactor was fully substituted with nitrogen gas, and the obtained titanium-containing polypropylene was washed with purified hexane four times. The results of analysis revealed that 2.7 g of propylene was polymerized per 1 g of titanium trichloride.

(Polymerization)

1 $m^3$ of liquid propylene, 2.4 mol of triethylaluminum, 1.2 mol of dicyclopentyl dimethoxysilane and hydrogen in a concentration of 1.0 mol % in a gas phase were added to a 2 $m^3$ autoclave whose inside had been substituted with $N_2$, and the inside temperature of the autoclave was raised to 55° C.

Thereafter, ethylene was supplied to the autoclave to ensure that the concentration of ethylene in a gas phase became 1.5 mol %, and the titanium-containing polypropylene obtained by prepolymerization was added in an amount of 0.3 mol in terms of titanium trichloride to carry out copolymerization between propylene and ethylene at 55° C. for 20 minute (step 1).

Thereafter, ethylene gas was supplied to ensure that the concentration of ethylene gas in the gas phase was raised to 10 mol % to carry out polymerization for 120 minutes (step 2). A microblend was obtained by purging unreacted monomers.

The thus obtained microblend was dried at 70° C. for 1 hour. The measurement results of the characteristic properties of the above microblend are shown in Table 1 as sample 13.

(Control of Molecular Weight)

0.2 part by weight of an antioxidant and 0.05 part by weight of 1,3-bis-(t-butylperoxyisopropyl)benzene as an organic peroxide were added to the above microblend and mixed together, and the resulting product was extrusion molded at 230° C. to obtain a pellet having a reduced molecular weight.

The measurement results of the characteristic properties of the thus obtained microblend are shown in Table 1 as sample 7.

Samples 8 and 9:

Microblends were produced in the same manner as the sample 7 except that the supply of ethylene and the supply of hydrogen were changed and microblends (samples 8 and 9) whose molecular weights have been controlled were obtained in the same manner as the sample 7.

The measurement results of the characteristic properties of the thus obtained microblends are shown in Table 1.

The measurement results of the characteristic properties of the microblend before the decomposition of the sample 8 are shown in Table 1 as sample 14.

Sample 10:

A microblend was produced using a metallocene-based catalyst and then a microblend (sample 10) whose molecular weight had been controlled was obtained in the same manner as the sample 7.

The measurement results of the characteristic properties of the obtained microblend are shown in Table 1.

Sample 11:

The measurement results of the characteristic properties of commercially marketed TPO which comprises a commercially available ethylene-propylene copolymer are shown in Table 1 as sample 11.

Sample 12:

Commercially available polypropylene (RB110 of Tokuyama Corporation) was used.

The abbreviations of fillers used in examples and comparative examples are shown in Table 2.

TABLE 1

| polymer | type | P-E random copolymer component | | |
|---|---|---|---|---|
| | | proportion (wt %) | amount of ethylene (mol %) | proportion of component eluting at −40 to 30° C. by TREF(wt %)*1 |
| sample 1 | microblend | 85 | 40 | 61 |
| sample 2 | propylene homopolymer | 0 | 0 | 2 |
| sample 3 | P-E random copolymer | 100 | 4 | 7 |
| sample 4 | P-E random copolymer | 100 | 20 | 38 |
| sample 5 | microblend | 96 | 45 | 77 |
| sample 6 | microblend | 95 | 65 | 84 |
| sample 7 | microblend | 91 | 36 | 70 |
| sample 8 | microblend | 86 | 26 | 55 |
| sample 9 | microblend | 95 | 6 | 8 |
| sample 10 | microblend | 91 | 89 | 21 |
| sample 11 | microblend | 99.5 | 45 | 96 |
| sample 12 | propylene homopolymer | 0 | 0 | 3 |
| sample 13 | polymer before decomposition of sample 7 | 91 | 36 | 70 |
| sample 14 | polymer before decomposition of sample 8 | 86 | 26 | 56 |

| polymer | proportion of component eluting by TREF*2 | | | weight average molecular weight Mw [×10$^4$] | MFR (g/10 min) |
|---|---|---|---|---|---|
| | lower than 20° C. | 20° C. or higher and lower than 100° C. | 100° C. or higher | | |
| sample 1 | 65 | 20 | 15 | 150 | <0.01 |
| sample 2 | 1 | 3 | 96 | 190 | <0.01 |
| sample 3 | 5 | 10 | 85 | 190 | <0.01 |
| sample 4 | 21 | 32 | 47 | 190 | <0.01 |
| sample 5 | 70 | 26 | 4 | 140 | <0.01 |
| sample 6 | 82 | 13 | 5 | 100 | <0.01 |
| sample 7 | 68 | 23 | 9 | 34 | 1.5 |
| sample 8 | 51 | 35 | 14 | 35 | 1.5 |
| sample 9 | 6 | 10 | 84 | 29 | 1.4 |
| sample 10 | 17 | 74 | 9 | 31 | 2.1 |
| sample 11 | 90 | 9.5 | 0.5 | 57 | 0.5 |
| sample 12 | 2 | 3 | 95 | 54 | 0.5 |
| sample 13 | 67 | 24 | 9 | 95 | 0.1 |
| sample 14 | 50 | 36 | 14 | 94 | 0.1 |

*1 o-dibromobenzene was used.
*2 o-dichlorobenzene was used.

TABLE 2

| | type of filler | |
|---|---|---|
| abbreviation | type of filler | |
| A | fibrous magnesium oxasulfate | |
| B | talc (lamellar) | |
| C | potassium titanate whisker (fibrous) | |
| D | magnesium hydroxide (lamellar) | |

In the tables showing examples and comparative examples, the total proportion of the propylene-ethylene copolymer components of the microblend is the total proportion of a component (component "a") eluting at a temperature lower than 20° C. fractionated by temperature rise elution fractionation using an o-dichlorobenzene solvent and a component (component "b") eluting at a temperature of 20° C. or higher and lower than 100° C., and the content of ethylene in the copolymer is the content of ethylene in the above propylene-ethylene copolymer.

Examples 1 to 9

0.05 part by weight of tetrakis[methylene(3,5-di-t-butyl-4-hydroxyphenyl)propionate]methane as an antioxidant, 1.5 parts by weight of 1,3-bis(t-butylperoxyisobutyl)benzene and 4.5 parts by weight of maleic anhydride were blended with 100 parts by weight of the above microblend as the sample 1 and stirred and mixed together fully by a Henschel mixer.

Thereafter, the obtained mixture was melt mixed by an extruder and cut into strands to obtain a modified microblend. 0.05 part by weight of tetrakis[methylene(3,5-di-t-butyl-4-hydroxyphenyl)propionate]methane as an antioxidant and an amount shown in Table 3 of a filler A or B shown in Table 2 were blended with 100 parts by weight of the obtained modified microblend and stirred and mixed together fully by a Henschel mixer.

Thereafter, the resulting mixture was melt mixed by an extruder and cut into strands to obtain a wear resistant resin composition.

The obtained wear resistant resin composition was molded and the results of measurements and evaluations of the composition are shown in Table 4.

Example 10

0.05 part by weight of tetrakis[methylene(3,5-di-t-butyl-4-hydroxyphenyl)propionate]methane as an antioxidant, 1.5 parts by weight of 1,3-bis(t-butylperoxyisobutyl)benzene and 4.5 parts by weight of maleic anhydride were blended with 100 parts by weight of the specific microblend as the sample 5 and stirred and mixed together fully by a Henschel mixer.

Thereafter, the obtained mixture was melt mixed by an extruder and cut into strands to obtain a resin composition. 0.05 part by weight of tetrakis[methylene(3,5-di-t-butyl-4-hydroxyphenyl)propionate]methane as an antioxidant and an amount shown in Table 3 of a filler A shown in Table 2 were blended with 100 parts by weight of the obtained resin composition and stirred and mixed together fully by a Henschel mixer.

Thereafter, the resulting mixture was melt mixed by an extruder and cut into strands to obtain a resin composition.

The obtained wear resistant resin composition was molded and the results of measurements and evaluations of the composition are shown in Table 4.

Example 11

0.05 part by weight of tetrakis[methylene(3,5-di-t-butyl-4-hydroxyphenyl)propionate]methane as an antioxidant, 1.5 parts by weight of 1,3-bis(t-butylperoxyisobutyl)benzene and 4.5 parts by weight of maleic anhydride were blended with 100 parts by weight of the microblend as the sample 1 and stirred and mixed together fully by a Henschel mixer.

Thereafter, the obtained mixture was melt mixed by an extruder and cut into strands to obtain a resin composition. 0.05 part by weight of tetrakis[methylene(3,5-di-t-butyl-4-hydroxyphenyl)propionate]methane as an antioxidant and an amount shown in Table 3 of a filler C shown in Table 2 were blended with 100 parts by weight of the obtained resin composition and stirred and mixed together fully by a Henschel mixer.

Thereafter, the resulting mixture was melt mixed by an extruder and cut into strands to obtain a resin composition.

The obtained resin composition was molded and the results of measurements and evaluations of the composition are shown in Table 4.

Example 12

10 parts by weight of the polypropylene homopolymer as the sample 2, 0.05 part by weight of tetrakis[methylene(3,5-di-t-butyl-4-hydroxyphenyl)propionate]methane as an antioxidant, 1.5 parts by weight of 1,3-bis(t-butylperoxyisobutyl)benzene and 4.5 parts by weight of maleic anhydride were blended with 90 parts by weight of the microblend as the sample 1 and stirred and mixed together fully by a Henschel mixer.

Thereafter, the obtained mixture was melt mixed by an extruder and cut into strands to obtain a resin composition. 0.05 part by weight of tetrakis[methylene(3,5-di-t-butyl-4-hydroxyphenyl)propionate]methane as an antioxidant and an amount shown in Table 3 of the filler A shown in Table 2 were blended with 100 parts by weight of the obtained resin composition and stirred and mixed together fully by a Henschel mixer.

Thereafter, the resulting mixture was melt mixed by an extruder and cut into strands to obtain a resin composition.

The obtained resin composition was molded and the results of measurements and evaluations of the composition are shown in Table 4.

Example 13

0.05 part by weight of tetrakis[methylene(3,5-di-t-butyl-4-hydroxyphenyl)propionate]methane as an antioxidant, 0.1 part by weight of 1,3-bis(t-butylperoxyisobutyl)benzene and 4.5 parts by weight of maleic anhydride were blended with 100 parts by weight of the microblend as the sample 1 and stirred and mixed together fully by a Henschel mixer.

Thereafter, the obtained mixture was melt mixed by an extruder and cut into strands to obtain a resin composition. 0.05 part by weight of tetrakis[methylene(3,5-di-t-butyl-4-hydroxyphenyl)propionate]methane as an antioxidant and an amount shown in Table 3 of the filler A shown in Table 2 were blended with 100 parts by weight of the obtained resin composition and stirred and mixed together fully by a Henschel mixer.

Thereafter, the resulting mixture was melt mixed by an extruder and cut into strands to obtain a resin composition.

The obtained resin composition was molded and the results of measurements and evaluations of the composition are shown in Table 4.

Example 14

10 parts by weight of the resin composition of Example 10, 0.05 part by weight of tetrakis[methylene(3,5-di-t-butyl-4-hydroxyphenyl)propionate]methane as an antioxidant and an amount shown in Table 3 of the filler A shown in Table 2 were blended with 90 parts by weight of the resin composition of Comparative Example 1, stirred and mixed together fully by a Henschel mixer.

Thereafter, the resulting mixture was melt mixed by an extruder and cut into strands to obtain a resin composition.

The obtained resin composition was molded and the results of measurements and evaluations of the composition are shown in Table 4.

TABLE 3

| | \multicolumn{5}{c}{resin composition} | | | | |
| | \multicolumn{5}{c}{modified microblend resin} | | | | |
| | \multicolumn{2}{c}{unmodified microblend} | \multicolumn{2}{c}{modified microblend} | concentration of |
| | type | proportion (wt %) | type*1 | proportion (wt %) | organic acid group (mmol/g) |
|---|---|---|---|---|---|
| Ex.1 | — | — | sample 1 | 100 | 0.20 |
| Ex.2 | — | — | sample 1 | 100 | 0.20 |
| Ex.3 | — | — | sample 1 | 100 | 0.20 |
| Ex.4 | — | — | sample 1 | 100 | 0.20 |
| Ex.5 | — | — | sample 1 | 100 | 0.20 |
| Ex.6 | — | — | sample 1 | 100 | 0.20 |
| Ex.7 | — | — | sample 1 | 100 | 0.20 |
| Ex.8 | — | — | sample 1 | 100 | 0.20 |
| Ex.9 | — | — | sample 1 | 100 | 0.20 |
| Ex.10 | — | — | sample 5 | 100 | 0.22 |
| Ex.11 | — | — | sample 1 | 100 | 0.20 |
| Ex.12 | — | — | sample 1,2*3 | 100 | 0.18 |
| Ex.13 | — | — | sample 1 | 100 | 0.20 |
| Ex.14 | sample 1 | 90 | sample 5 | 10 | 0.02 |

| | \multicolumn{5}{c}{resin composition} | | | | |
| | \multicolumn{5}{c}{filler} | | | | |
| | type | amount*2 (parts by weight) | average fiber diameter or average particle diameter (μm) | aspect ratio | MFR (g/10 min) |
|---|---|---|---|---|---|
| Ex.1 | A | 50 | 0.8 | 30 | 10 |
| Ex.2 | A | 5 | 0.8 | 30 | 23 |
| Ex.3 | A | 150 | 0.8 | 30 | 4 |
| Ex.4 | A | 250 | 0.8 | 30 | 3 |
| Ex.5 | B | 50 | 4 | 25 | 19 |
| Ex.6 | B | 5 | 4 | 25 | 27 |
| Ex.7 | B | 150 | 4 | 25 | 11 |
| Ex.8 | B | 250 | 4 | 25 | 10 |
| Ex.9 | B | 50 | 1.5 | 570 | 7 |
| Ex.10 | A | 50 | 0.8 | 30 | 10 |
| Ex.11 | C | 50 | 0.5 | 50 | 11 |
| Ex.12 | A | 50 | 0.8 | 30 | 13 |
| Ex.13 | A | 50 | 0.8 | 30 | 1 |
| Ex.14 | A | 350 | 0.8 | 30 | 10 |

Ex. = Example
*1) microblend before modification
*2) based on 100 parts by weight of modified microblend resin
*3) a mixture of sample 1 and sample 2 in a weigh ratio of 9:1

TABLE 4

| | \multicolumn{5}{c}{measurement items of physical properties} | | | | |
| | compressive stress at a distortion of 5% (MPa) | compressive stress relaxation value (%) | wear resistance (%) | flexural modulus (MPa) | appearance of molded product |
|---|---|---|---|---|---|
| Ex.1 | 9 | 45 | 10 | 700 | good |
| Ex.2 | 6 | 67 | 6 | 180 | good |
| Ex.3 | 15 | 33 | 14 | 1000 | good |
| Ex.4 | 17 | 23 | 16 | 1100 | good |
| Ex.5 | 7 | 51 | 11 | 600 | good |
| Ex.6 | 5 | 68 | 6 | 220 | good |
| Ex.7 | 11 | 40 | 14 | 900 | good |
| Ex.8 | 16 | 28 | 16 | 1100 | good |
| Ex.9 | 17 | 27 | 17 | 900 | good |
| Ex.10 | 9 | 60 | 12 | 350 | good |

TABLE 4-continued

| | | | | | |
|---|---|---|---|---|---|
| Ex.11 | 8 | 46 | 10 | 700 | good |
| Ex.12 | 10 | 41 | 11 | 860 | good |
| Ex.13 | 19 | 22 | 19 | 1800 | bad |
| Ex.14 | 7 | 50 | 15 | 750 | good |

| | measurement items of physical properties | | | |
|---|---|---|---|---|
| | heat resistance Vicat softening temperature (° C.) | tensile necking properties | appearance of strand extruded by capillograph | amount of gel (wt %) |
| Ex.1 | 135 | not seen | excellent | 46 |
| Ex.2 | 127 | not seen | excellent | 32 |
| Ex.3 | 139 | not seen | excellent | 47 |
| Ex.4 | 140 | not seen | excellent | 48 |
| Ex.5 | 128 | not seen | excellent | 31 |
| Ex.6 | 126 | not seen | excellent | 23 |
| Ex.7 | 131 | not seen | excellent | 32 |
| Ex.8 | 133 | not seen | excellent | 33 |
| Ex.9 | 129 | not seen | excellent | 32 |
| Ex.10 | 136 | not seen | excellent | 47 |
| Ex.11 | 127 | not seen | excellent | 27 |
| Ex.12 | 135 | not seen | excellent | 41 |
| Ex.13 | 135 | not seen | excellent | 39 |
| Ex.14 | 128 | not seen | excellent | 15 |

Ex. = Example

Comparative Example 1

0.05 part by weight of tetrakis[methylene(3,5-di-t-butyl-4-hydroxyphenyl)propionate]methane as an antioxidant was blended with 100 parts by weight of the microblend as the sample 1 and stirred and mixed together fully by a Henschel mixer. Thereafter, the obtained mixture was melt mixed by an extruder and cut into strands to obtain a resin composition.

0.05 part by weight of tetrakis[methylene(3,5-di-t-butyl-4-hydroxyphenyl)propionate]methane as an antioxidant and an amount shown in Table 5 of the filler A shown in Table 2 were blended with 100 parts by weight of the obtained resin composition and stirred and mixed together fully by a Henschel mixer.

Thereafter, the resulting mixture was melt mixed by an extruder and cut into strands to obtain a resin composition.

The obtained resin composition was molded and the results of measurements and evaluations of the composition are shown in Table 6.

Comparative Example 2

0.05 part by weight of tetrakis[methylene(3,5-di-t-butyl-4-hydroxyphenyl) propionate]methane as an antioxidant, 1.5 parts by weight of 1,3-bis(t-butylperoxyisobutyl)benzene and 4.5 parts by weight of maleic anhydride were blended with 100 parts by weight of the microblend as the sample 1 and stirred and mixed together fully by a Henschel mixer.

Thereafter, the obtained mixture was melt mixed by an extruder and cut into strands to obtain a resin composition. 0.05 part by weight of tetrakis[methylene(3,5-di-t-butyl-4-hydroxyphenyl)propionate]methane as an antioxidant was blended with 100 parts by weight of the obtained resin composition and stirred and mixed together fully by a Henschel mixer.

Thereafter, the resulting mixture was melt mixed by an extruder and cut into strands to obtain a resin composition.

The obtained resin composition was molded and the results of measurements and evaluations of the composition are shown in Table 6.

Comparative Example 3

0.05 part by weight of tetrakis[methylene(3,5-di-t-butyl-4-hydroxyphenyl)propionate]methane as anantioxidant, 1.5 parts by weight of 1,3-bis(t-butylperoxyisobutyl)benzene and 4.5 parts by weight of maleic anhydride were blended with 100 parts by weight of the polypropylene homopolymer as the sample 2 and stirred and mixed together fully by a Henschel mixer. Thereafter, the obtained mixture was melt mixed by an extruder and cut into strands to obtain a resin composition.

0.05 part by weight of tetrakis[methylene(3,5-di-t-butyl-4-hydroxyphenyl)propionate]methane as an antioxidant and an amount shown in Table 5 of the filler A shown in Table 2 were blended with 100 parts by weight of the obtained resin composition and stirred and mixed together fully by a Henschel mixer.

Thereafter, the resulting mixture was melt mixed by an extruder and cut into strands to obtain a resin composition.

The obtained resin composition was molded and the results of measurements and evaluations of the composition are shown in Table 6.

Comparative Example 4

0.05 part by weight of tetrakis[methylene(3,5-di-t-butyl-4-hydroxyphenyl)propionate]methane as an antioxidant, 1.5 parts by weight of 1,3-bis(t-butylperoxyisobutyl)benzene and 4.5 parts by weight of maleic anhydride were blended with 100 parts by weight of the P-E random copolymer as the sample 3 and stirred and mixed together fully by a Henschel mixer.

Thereafter, the obtained mixture was melt mixed by an extruder and cut into strands to obtain a resin composition.

0.05 part by weight of tetrakis[methylene(3,5-di-t-butyl-4-hydroxyphenyl)propionate]methane as an antioxidant and an amount shown in Table 5 of the filler A shown in Table 2 were blended with 100 parts by weight of the obtained resin composition and stirred and mixed together fully by a Henschel mixer.

Thereafter, the resulting mixture was melt mixed by an extruder and cut into strands to obtain a resin composition.

The obtained resin composition was molded and the results of measurements and evaluations of the composition are shown in Table 6.

Comparative Example 5

0.05 part by weight of tetrakis[methylene(3,5-di-t-butyl-4-hydroxyphenyl)propionate]methane as an antioxidant, 1.5 parts by weight of 1,3-bis(t-butylperoxyisobutyl)benzene and 4.5 parts by weight of maleic anhydride were blended with 100 parts by weight of the P-E random copolymer as the sample 4 and stirred and mixed together fully by a Henschel mixer.

Thereafter, the obtained mixture was melt mixed by an extruder and cut into strands to obtain a resin composition. 0.05 part by weight of tetrakis[methylene(3,5-di-t-butyl-4-hydroxyphenyl)propionate]methane as an antioxidant and an amount shown in Table 5 of the filler A shown in Table 2 were blended with 100 parts by weight of the obtained resin composition and stirred and mixed together fully by a Henschel mixer.

Thereafter, the resulting mixture was melt mixed by an extruder and cut into strands to obtain a polyolefin resin composition.

The obtained resin composition was molded and the results of measurements and evaluations of the composition are shown in Table 6.

Comparative Example 6

0.05 part by weight of tetrakis[methylene(3,5-di-t-butyl-4-hydroxyphenyl)propionate]methane as an antioxidant, 1.5 parts by weight of 1,3-bis(t-butylperoxyisobutyl)benzene and 4.5 parts by weight of maleic anhydride were blended with 100 parts by weight of the microblend as the sample 6 and stirred and mixed together fully by a Henschel mixer.

Thereafter, the obtained mixture was melt mixed by an extruder and cut into strands to obtain a resin composition. 0.05 part by weight of tetrakis[methylene(3,5-di-t-butyl-4-hydroxyphenyl)propionate]methane as an antioxidant and an amount shown in Table 5 of the filler A shown in Table 2 were blended with 100 parts by weight of the obtained resin composition and stirred and mixed together fully by a Henschel mixer.

Thereafter, the resulting mixture was melt mixed by an extruder and cut into strands to obtain a resin composition.

The obtained resin composition was molded and the results of measurements and evaluations of the composition are shown in Table 6.

TABLE 5

| | resin composition microblend resin | | | | |
| --- | --- | --- | --- | --- | --- |
| | unmodified microblend | | modified microblend | | concentration of |
| | type | proportion (wt %) | type*1 | proportion (wt %) | organic acid group (mmol/g) |
| C.Ex.1 | sample 1 | 100 | — | — | 0 |
| C.Ex.2 | — | — | sample 1 | 100 | 0.20 |
| C.Ex.3 | — | — | sample 2 | 100 | 0.01 |
| C.Ex.4 | — | — | sample 3 | 100 | 0.01 |
| C.Ex.5 | — | — | sample 4 | 100 | 0.17 |
| C.Ex.6 | — | — | sample 6 | 100 | 0.37 |

| | resin composition | | | | |
| --- | --- | --- | --- | --- | --- |
| | filler | | | | |
| | type | amount*2 (parts by weight) | average fiber diameter or average particle diameter ($\mu$m) | aspect ratio | MFR (g/10 min) |
| C.Ex.1 | A | 50 | 0.8 | 30 | 12 |
| C.Ex.2 | — | — | — | — | 27 |
| C.Ex.3 | A | 50 | 0.8 | 30 | 45 |
| C.Ex.4 | A | 50 | 0.8 | 30 | 30 |
| C.Ex.5 | A | 50 | 0.8 | 30 | 11 |
| C.Ex.6 | A | 50 | 0.8 | 30 | 5 |

C.Ex. = Comparative Example
*1) microblend before modification
*2) based on 100 parts by weight of modified microblend

TABLE 6

| | measurement items of physical properties | | | | |
| --- | --- | --- | --- | --- | --- |
| | compressive stress at a distortion of 5% (MPa) | compressive stress relaxation value (%) | wear resistance (%) | flexural modulus (MPa) | appearance of molded product |
| C.Ex.1 | 0.2 | 85 | 41 | 180 | good |
| C.Ex.2 | 0.3 | 75 | 25 | 120 | good |
| C.Ex.3 | 46 | 2 | 21 | 5700 | bad |
| C.Ex.4 | 38 | 4 | 22 | 4600 | bad |

TABLE 6-continued

| | | | | | |
|---|---|---|---|---|---|
| C.Ex.5 | 10 | 52 | 8 | 1000 | good |
| C.Ex.6 | 1 | 35 | 18 | 110 | good |

| | measurement items of physical properties | | | |
|---|---|---|---|---|
| | heat resistance Vicat softening temperature (° C.) | tensile necking properties | appearance of strand extruded by capillograph | amount of gel (wt %) |
| C.Ex.1 | 74 | seen | bad | 0 |
| C.Ex.2 | 78 | not seen | good | 10 |
| C.Ex.3 | 121 | seen | bad | 1 |
| C.Ex.4 | 95 | seen | bad | 1 |
| C.Ex.5 | 111 | seen | good | 9 |
| C.Ex.6 | 109 | seen | good | 19 |

C.Ex. = Comparative Example

Example 15

0.05 part by weight of tetrakis[methylene(3,5-di-t-butyl-4-hydroxyphenyl)propionate]methane as an antioxidant, 0.9 part by weight of 1,3-bis(t-butylperoxyisobutyl)benzene and 4.5 parts by weight of maleic anhydride were blended with 100 parts by weight of the microblend (sample 7) and stirred and mixed together fully by a Henschel mixer.

Thereafter, the obtained mixture was melt mixed by a 50 mm-diameter single-screw extruder and cut into strands to obtain a modified microblend. The obtained modified microblend had an MFR of 50 g/10 min and an organic acid group concentration of 0.29 mmol/g.

Amounts shown in Table 7 of the microblend, the modified microblend and a filler D (magnesium hydroxide (crosslinking agent)) shown in Table 2, and 0.05 part by weight of tetrakis[methylene(3,5-di-t-butyl-4-hydroxyphenyl)propionate]methane as an antioxidant were blended with 100 parts by weight of polypropylene and stirred and mixed together fully by a Henschel mixer.

Thereafter, the resulting mixture was melt mixed by a vented 45 mm-diameter double-screw extruder and cut into strands to obtain a resin composition.

The obtained resin composition was molded and the results of measurements and evaluations of the composition are shown in Table 8.

Examples 16 to 21

Resin compositions were obtained in the same manner as in Example 15 except that the amounts of the microblend, the modified microblend and magnesium hydroxide were changed as shown in Table 7.

The thus obtained resin compositions were molded and the results of measurements and evaluations of the compositions are shown in Table 8.

Example 22

0.05 part by weight of tetrakis[methylene(3,5-di-t-butyl-4-hydroxyphenyl) propionate ]methane as an antioxidant, 0.9 part by weight of 1,3-bis(t-butylperoxyisobutyl)benzene and 4.5 parts by weight of maleic anhydride were blended with 100 parts by weight of the microblend (sample 8) and stirred and mixed together fully by a Henschel mixer.

Thereafter, the obtained mixture was melt mixed by a 50 mm-diameter single-screw extruder and cut into strands to obtain a modified microblend. The MFR of and organic acid group concentration of the obtained modified microblend are shown in Table 7.

Amounts shown in Table 7 of the microblend (sample 8), the modified microblend and magnesium hydroxide (crosslinking agent) and 0.05 part by weight of tetrakis [methylene(3,5-di-t-butyl-4-hydroxyphenyl)propionate] methane as an antioxidant were blended with 100 parts by weight of polypropylene and stirred and mixed together fully by a Henschel mixer.

Thereafter, the resulting mixture was melt mixed by a vented 45 mm-diameter double-screw extruder and cut into strands to obtain a resin composition.

The obtained resin composition was molded and the results of measurements and evaluations of the composition are shown in Table 8.

TABLE 7

| | resin composition | | | | | | |
|---|---|---|---|---|---|---|---|
| | microblend resin | | | | | | |
| | unmodified microblend | | modified microblend | | concentration of | polypropylene | |
| | type | proportion (wt %) | type*1 | proportion (wt %) | organic acid group (mmol/g) | type | amount*2 (parts by weight) |
| Ex.15 | sample 7 | 50 | sample 13 | 50 | 0.14 | sample 12 | 100 |
| Ex.16 | sample 8 | 50 | sample 13 | 50 | 0.14 | sample 12 | 100 |
| Ex.17 | sample 7 | 17 | sample 13 | 83 | 0.24 | sample 12 | 83 |
| Ex.18 | sample 7 | 67 | sample 13 | 33 | 0.10 | sample 12 | 67 |
| Ex.19 | sample 7 | 50 | sample 13 | 50 | 0.14 | sample 12 | 250 |
| Ex.20 | sample 7 | 50 | sample 13 | 50 | 0.14 | sample 12 | 100 |
| Ex.21 | sample 7 | 50 | sample 13 | 50 | 0.14 | sample 12 | 42 |

TABLE 7-continued

| | | | | | | | |
|---|---|---|---|---|---|---|---|
| Ex.22 | sample 8 | 50 | sample 14 | 50 | 0.10 | sample 12 | 100 |

| | | resin composition | | | |
|---|---|---|---|---|---|
| | | filler | | | |
| | type | amount*3 (parts by weight) | average fiber diameter or average particle diameter (μm) | aspect ratio | MFR (g/10 min) |
|---|---|---|---|---|---|
| Ex.15 | D | 100 | 1.2 | 5 | <0.01 |
| Ex.16 | D | 100 | 1.2 | 5 | <0.01 |
| Ex.17 | D | 180 | 1.2 | 5 | <0.01 |
| Ex.18 | D | 160 | 1.2 | 5 | <0.01 |
| Ex.19 | D | 70 | 1.2 | 5 | <0.01 |
| Ex.20 | D | 50 | 1.2 | 5 | <0.01 |
| Ex.21 | D | 235 | 1.2 | 5 | <0.01 |
| Ex.22 | D | 100 | 1.2 | 5 | <0.01 |

Ex. = Example
*1 microblend before modification
*2 based on 100 parts by weight of modified microblend
*3 based on 100 parts by weight of the total of microblend resin and polypropylene

TABLE 8

| measurement items of physical properties | | | | |
|---|---|---|---|---|
| compressive stress at a distortion of 5% (MPa) | compressive stress relaxation value (%) | wear resistance (%) | flexural modulus (MPa) | appearance of molded product |
| Ex.15 | 11 | 48 | 10 | 700 | good |
| Ex.16 | 13 | 45 | 9 | 750 | good |
| Ex.17 | 14 | 44 | 9 | 770 | good |
| Ex.18 | 16 | 50 | 11 | 640 | good |
| Ex.19 | 17 | 36 | 8 | 940 | good |
| Ex.20 | 9 | 54 | 12 | 570 | good |
| Ex.21 | 18 | 34 | 15 | 1000 | good |
| Ex.22 | 13 | 43 | 9 | 790 | good |

| measurement items of physical properties | | | |
|---|---|---|---|
| heat resistance Vicat softening temperature (° C.) | tensile necking properties | appearance of strand extruded by capillograph | amount of gel (wt %) |
| Ex.15 | 140 | not seen | excellent | 35 |
| Ex.16 | 141 | not seen | excellent | 36 |
| Ex.17 | 144 | not seen | excellent | 55 |
| Ex.18 | 139 | not seen | excellent | 33 |
| Ex.19 | 140 | not seen | excellent | 31 |
| Ex.20 | 139 | not seen | excellent | 37 |
| Ex.21 | 144 | not seen | excellent | 46 |
| Ex.22 | 139 | seen | excellent | 32 |

Ex. = Example

What is claimed is:

1. A wear resistant resin composition comprising:

(A) 100 parts by weight of a modified microblend obtained by bonding an organic acid group to a microblend consisting of 1 to 70 wt % of polypropylene and 99 to 30 wt % of a propylene-ethylene random copolymer consisting of 15 to 50 mol % of an ethylene polymer unit and 85 to 50 mol % of a propylene polymer unit, or a mixture of the microblend and the modified microblend, the concentration of the organic acid group in the modified microblend or the mixture being 0.01 to 1 mmol based on 1 g of the microblend, and the microblend containing 10 to 90 wt % of a component eluting at a temperature of −40 to +30° C. based on the total of all the eluting components fractionated by temperature rise elution fractionation using o-dibromobenzene as a solvent; and (B) 1 to 1,000 parts by weight of at least one filler which is ionically crosslinkable and is selected from the group consisting of a fibrous filler and a lamellar filler, and the resin composition containing a gel in an amount of 10 to 80 wt % and having a flexural modulus of 2,000 MPa or less.

2. The composition of claim 1, wherein the microblend consists of (a) 20 to 80 wt % of a component eluting at a temperature of −40° C. or more and less than +20° C., (b) 10 to 70 wt % of a component eluting at a temperature of +20° C. or more and less than +100° C., and (c) 1 to 40 wt % of a component eluting at a temperature of +100° C. or more, all of which are fractionated by temperature rise elution fractionation using o-dibromobenzene as a solvent, the total of the components (a), (b) and (c) being 100 wt %.

3. The composition of claim 1, wherein the mixture of the microblend and the modified microblend consists of 10 to 90 wt % of the microblend and 90 to 10 wt % of the modified microblend.

4. The composition of claim 1, wherein the fibrous filler has an average particle diameter of 0.1 to 2 μm and an aspect ratio of 3 to 1,000.

5. The composition of claim 1, wherein the lamellar filler has an average diameter of 0.5 to 10 μm and an aspect ratio of 3 to 2,000.

6. The composition of claim 1, wherein the filler is a lamellar filler composed of ionically crosslinkable magnesium hydroxide.

7. The composition of claim 1 which further contains polypropylene in an amount of 500 parts or less by weight based on 100 parts by weight of the modified microblend or the mixture.

8. The composition of claim 1, wherein the amount of a component eluting at a temperature of −40 to +30° C. is 30 to 80 wt % based on the total of all the eluting components fractionated by temperature rising elution fractionation using an o-dibromobenzene solvent.

9. The composition of claim 1, wherein the microblend consists of 1 to 40 wt % of polypropylene and 99 to 60 wt % of a propylene-ethylene random copolymer which consists of 15 to 40 mol % of an ethylene polymer unit and 85 to 60 mol % of a propylene polymer unit.

10. The composition of claim 1, wherein the fibrous filler is selected from the group consisting of fibrous magnesium oxysulfate, potassium titanate fibers, magnesium hydroxide fibers, aluminum borate fibers, calcium silicate fibers, calcium carbonate fibers, glass fibers, carbon fibers, metal fibers, asbestos, wollastonite, gypsum fibers, mineral fibers, and organic fibers.

11. The composition of claim 1, wherein the fibrous filler is selected from the group consisting of talc, mica, clay, glass flake, graphite, aluminum flake, kaolin clay, iron oxide, sericite, molybdenum disulfide, barium sulfate, vermiculite, magnesium hydroxide, aluminum hydroxide and hydrotalcite.

* * * * *

UNITED STATES PATENT AND TRADEMARK OFFICE
CERTIFICATE OF CORRECTION

PATENT NO. : 6,664,321 B2
DATED : December 16, 2003
INVENTOR(S) : Ayama, Kazuhiko et al.

It is certified that error appears in the above-identified patent and that said Letters Patent is hereby corrected as shown below:

<u>Title page,</u>
Item [73], Assignee, should read as follows:
-- [73]  Assignee: IDEMITSU PETROCHEMICAL CO., LTD., TOKYO (JP) --

Signed and Sealed this

Twenty-eighth Day of June, 2005

JON W. DUDAS
*Director of the United States Patent and Trademark Office*